US010728886B2

(12) United States Patent
Klingenbrunn et al.

(10) Patent No.: US 10,728,886 B2
(45) Date of Patent: Jul. 28, 2020

(54) COMMUNICATION DEVICE AND METHOD FOR DECODING DATA FROM A NETWORK

(71) Applicant: Intel IP Corporation, Santa Clara, CA (US)

(72) Inventors: Thomas Klingenbrunn, San Diego, CA (US); Ravi Gopalan, San Diego, CA (US); Lokesh Naidu Royapati, San Diego, CA (US); Hareesh Kodali, San Diego, CA (US); Phani Boddapati, Bangalore (IN); Pradeep Hosanagara Nagaraja, Kundapura (IN)

(73) Assignee: Apple Inc., Cupertino, CA (US)

( * ) Notice: Subject to any disclaimer, the term of this patent is extended or adjusted under 35 U.S.C. 154(b) by 328 days.

(21) Appl. No.: 15/191,564

(22) Filed: Jun. 24, 2016

(65) Prior Publication Data

US 2017/0374651 A1 Dec. 28, 2017

(51) Int. Cl.
*H04W 72/04* (2009.01)
*H04L 1/18* (2006.01)
*H04L 5/00* (2006.01)
*H04W 74/08* (2009.01)

(52) U.S. Cl.
CPC ......... *H04W 72/042* (2013.01); *H04L 1/1812* (2013.01); *H04L 1/1829* (2013.01); *H04L 5/0055* (2013.01); *H04W 74/0833* (2013.01)

(58) Field of Classification Search
None
See application file for complete search history.

(56) References Cited

U.S. PATENT DOCUMENTS

| 9,706,385 | B1* | 7/2017 | Sevindik | H04W 4/70 |
|---|---|---|---|---|
| 2009/0262681 | A1* | 10/2009 | Park | H04W 74/0841 370/328 |
| 2010/0182952 | A1* | 7/2010 | Jeong | H04L 1/189 370/328 |
| 2011/0154170 | A1* | 6/2011 | Challa | H03M 13/6525 714/807 |
| 2012/0195217 | A1* | 8/2012 | Sato | H04L 1/0003 370/252 |

(Continued)

FOREIGN PATENT DOCUMENTS

EP 2517393 A1 10/2012
WO 2011084818 A1 7/2011

OTHER PUBLICATIONS

The Extended European Search Report based on Application No. 17172600.3 (8 Pages) dated Oct. 25, 2017 (Reference Purpose Only).

*Primary Examiner* — Gregory B Sefcheck
*Assistant Examiner* — Jenkey Van
(74) *Attorney, Agent, or Firm* — Kowert, Hood, Munyon, Rankin & Goetzel, P.C.

(57) ABSTRACT

A communication device and method adapted for network data decoding and connection modes switching in a mobile communication system consisting of connecting to a network in a first mode comprising decoding data received from the network; receiving a message from the network; transmitting a negative acknowledgement (NACK) for the message to the network; identifying a retransmission of the message from the network; and switching to a second mode comprising skipping data decoding based on the identified retransmission of the message from the network.

14 Claims, 9 Drawing Sheets

(56) References Cited

U.S. PATENT DOCUMENTS

2014/0064098 A1* 3/2014 Choi ............... H04W 28/0273
370/236
2015/0092645 A1 4/2015 Tabet et al.

* cited by examiner

COMMUNICATION DEVICE AND METHOD FOR DECODING DATA FROM A NETWORK

TECHNICAL FIELD

Various aspects of this disclosure relate generally to a method and a device for wireless communications.

BACKGROUND

In long term evolution (LTE) downlink traffic scenarios, a user equipment (UE) has to wake up every transmission time interval (TTI), i.e. every 1 millisecond (ms), and check the physical downlink control channel (PDCCH) for a downlink grant. This occurs even though the Evolved Node B (eNodeB or eNB) doesn't schedule the downlink data on the physical downlink shared channel (PDSCH) to the UE for most of the time, causing the UE to inefficiently consume power.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
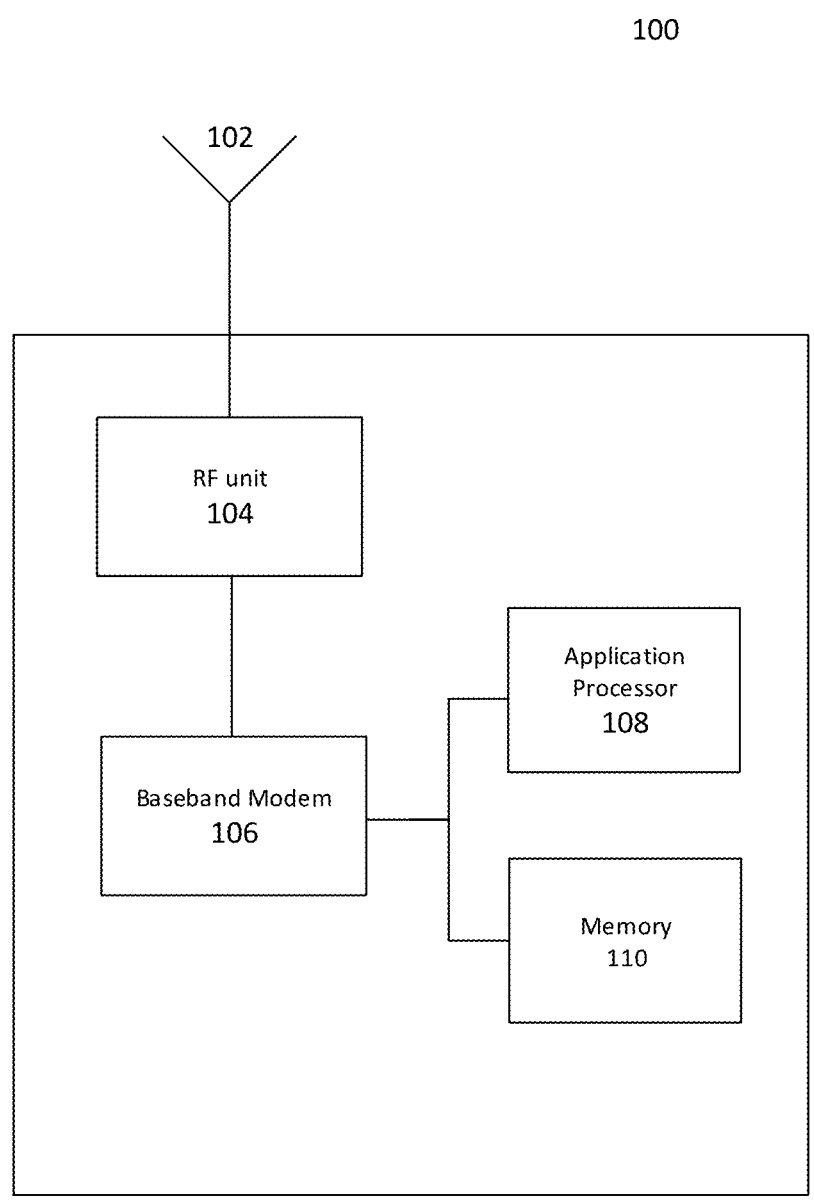
FIG. 1 shows a communication device in an aspect of this disclosure.

The following details description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

As used herein, a "circuit" may be understood as any kind of a logic implementing entity, which may be special purpose circuitry or a processor executing software stored in a memory, firmware, and any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, e.g., any kind of computer program, for example, a computer program using a virtual machine code, e.g., Java. Any other kind of implementation of the respective functions which will be described in more detail below may also be understood as a "circuit". It may also be understood that any two (or more) of the described circuits may be combined into one circuit.

A "processing circuit" (or equivalently "processing circuitry") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or nonvolatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

As used herein, a "cell", in the context of telecommunications, may be understood as a sector served by a base station or a test box. Accordingly, a cell may be a set of geographically co-located antennas that correspond to a particular sector of a base station. A base station may thus serve one or more "cells" (or "sectors"), where each cell is characterized by a distinct communication channel. An "inter-cell handover" may be understood as a handover from a first "cell" to a second "cell", where the first "cell" is different from the second "cell". "Inter-cell handovers" may be characterized as either "inter-base station handovers" or "intra-base station handovers". "Inter-base station handovers" may be understood as a handover from a first "cell" to a second "cell", where the first "cell" is provided at a first base station and the second "cell" is provided at a second, different, base station. "Intra-base station handovers" may be understood as a handover from a first "cell" to a second "cell", where the first "cell" is provided at the same base station as the second "cell". A "serving cell" may be understood as a "cell" that a mobile terminal is currently connected to according to the mobile communications protocols of the associated mobile communications network standard. Furthermore, the term "cell" may be utilized to refer to any of a macrocell, microcell, picocell, or femtocell, etc.

The term "base station", used in reference to an access point of a mobile communications network, may be understood as a macro-base station, micro-base station, Node B, evolved Node B (eNodeB, eNB), Home eNodeB, Remote Radio Head (RRH), or relay point, etc. Additionally, a "base station" may be understood as a test box which provides an access point to a mobile communication network in text case scenarios.

It is to be noted the ensuing description discusses utilization of the mobile communications device under 3GPP (Third Generation Partnership Project) specifications, notably Long Term Evolution (LTE), Long Term Evolution-Advanced (LTE-A), and/or 5G. It is understood that such exemplary scenarios are demonstrative in nature, and accordingly may be similarly applied to other mobile communication technologies and standards, such as WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The examples provided herein are thus understood as being applicable to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, is intended to encompass both an access component of a network (e.g. a radio access network (RAN) component) and a core component of a network (e.g. a core network component).

In LTE downlink traffic scenarios, a UE has to wake up every transmission time interval (TTI), i.e. every 1 millisecond (ms), and check the physical downlink control channel (PDCCH) for a downlink grant. This occurs even though the eNB doesn't schedule the downlink data on the physical downlink shared channel (PDSCH) to the UE for most of the time. This results to very inefficient power consumption by the UE.

In order to conserve power in such scenarios, the UE could skip decoding of the PDSCH in certain cases, relying on eNB hybrid automatic repeat request (HARQ) retransmissions to obtain a downlink transmission in a second attempt. However, skipping the decoding of the PDSCH is not plausible if the network side, e.g. a test box in a test scenario, deliberately disables HARQ retransmissions. To address this, a detection logic to ensure that PDSCH decoding is skipped only when the network/test box side supports retransmissions is disclosed.

In an aspect of this disclosure, a communication device and a method ensure that PDSCH decoding is skipped only when retransmissions are supported from the network or test box side. After receiving the connection setup message (i.e. Message 4) in the random access channel (RACH) setup procedure, the communication device is configured to toggle between a robust mode in which PDSCH decoding is not skipped and a power efficient mode in which PDSCH decoding is skipped.

FIG. 1 shows a communication device 100 in an aspect of this disclosure. Communication device 100 is configured to switch between two modes for decoding PDSCH.

It is appreciated that communication device 100 is exemplary in nature and may thus be simplified for purposes of this explanation.

As shown in FIG. 1, communication device 100 may include an antenna 102, a radio frequency (RF) unit 104 (i.e. RF transceiver), a baseband modem 106, and an application processor 108. These components may be implemented as separate components. However, as depicted in FIG. 1, it is appreciated that the configuration of communication device 100 is for purposes of explanation, and accordingly, one or more of the aforementioned components of communication device 100 may be integrated into a single equivalent component or divided into multiple components with collective equivalence. It is also appreciated that communication device 100 may have one or more additional components, such as hardware, software, or firmware elements. For example, communication device 100 may also include various additional components including processors, microprocessors, at least one memory component, subscriber identity module(s) (SIM), at least one power supply, peripheral device(s) and other specialty or generic hardware, processors, or circuits, etc., in order to support a variety of additional operations. The at least one memory component of communication device 100 may be configured to store program instructions. The communication device 100 may have a non-transitory computer readable medium for storing program instructions for causing a processor to execute the program instructions. Communication device 100 may also include a variety of user input/output devices, such as display(s), keypad(s), touchscreen(s), speaker(s), microphone(s), button(s), camera(s), etc.

In an overview of the operation of communication device 100, communication device 100 may be configured to receive and/or transmit wireless signals according to multiple different wireless access protocols or radio access technologies (RATs), for example, any one or combination of: Long-Term Evolution (LTE), Global System for Mobile Communications (GSM), Universal Mobile Telecommunications System (UMTS), Code Division Multiple Access (CDMA), Wideband CDMA (W-CDMA), Wi-Fi, Wireless Local Area Network (WLAN), Bluetooth, etc. It is appreciated that separate components may be provided for each distinct type of compatible wireless signal, such as a dedicated LTE antenna, RF transceiver, and baseband modem for LTE reception and transmission and a dedicated Wi-Fi antenna, RF transceiver, and a baseband modem for Wi-Fi reception and transmission. Alternatively, one or more components of communication device 100 may be shared between different wireless access protocols, such as, for example, by sharing an antenna 102 between multiple different wireless access protocols or RATs. In an exemplary aspect of this disclosure, RF unit 104 and/or baseband modem 106 may operate according to multiple communication access protocols (i.e. "multi-mode"), and thus may be configured to support one or more of LTE, GSM, and/or UMTS access protocols.

Furthermore, RF unit 104 may receive frequency wireless signals via antenna 102, which may be implemented as, for example, a single antenna or an antenna array composed of multiple antennas. Antenna 102 may be internal to communication device 100. RF unit 104 may include various reception circuitry elements, for example, analog circuitry configured to process externally received signals, such as circuitry to convert externally received RF signals to baseband and/or intermediate frequencies. RF unit 104 may also include amplification circuitry to amplify externally received signals, such power amplifiers and/or Low Noise Amplifies, although it is appreciated that such components may also implemented separately. RF unit 104 may additionally include various transmission circuit elements configured to transmit signals, such as, for example, baseband and/or intermediate frequency signals provided by the baseband modem 106, which may include mixing circuitry to modulate signals onto one or more radio frequency carrier waves and/or amplification circuitry to amplify internal signals before transmission. The RF unit 104 may provide such signals to antenna 102 for wireless transmission. Although not explicitly depicted in FIG. 1, RF unit 104 may be additionally connected to application processor 108.

Baseband modem 106 may include digital processing circuit(s) and a baseband memory, and may include one or more additional components, including one or more analog circuits.

The digital processing circuits may be composed of various processing circuitry configured to perform baseband (also including "intermediate") frequency processing, such as Analog to Digital Converters and/or Digital to Analog Converters, modulation/demodulation circuitry, encoding/decoding circuitry, audio codec circuitry, digital signal processing circuitry, etc. The digital processing circuit(s) may include hardware, software, or a combination of hardware and software. Specifically, digital processing circuit(s) of baseband modem 106 may include one or more logic circuits, processors, microprocessors, controllers, microcontrollers, scalar processors, vector processors, Central Processing Units (CPU), Graphics Processing Units (GPU) (including General-Purpose Computing on GPU (GPGPU)), Digital Signal Processors (DSP), Field Programmable Gate Arrays (FPGA), integrated circuits, Application Specific Integrated Circuits (ASIC), etc., or any combination thereof The baseband memory may include volatile and/or non-volatile memory, including random access memory (RAM), read-only memory (ROM), flash memory, solid-state storage, magnetic tape, hard disk drive(s), optical drive(s), register(s), shift register(s), processor register(s), data buffer(s) etc., or any combination thereof. The baseband memory may be configured to store software elements, which may be retrieved and executed using a processor component of digital processing circuitry. The baseband memory may be implemented as one or more separate components in the baseband modem 106 and may also be partially or fully integrated with the digital processing circuitry.

The baseband modem 106 may be configured to operate one or more protocol stacks, such as a GSM protocol stack, an LTE protocol stack, a UMTS protocol stack, etc. or any combination thereof. Baseband modem 106 may be multi-mode and may thus be configured to operate in accordance with multiple RATs by executing multiple protocol stacks simultaneously. The digital processing circuit(s) in the baseband modem may therefore include a processor configured to execute program code in accordance with the protocol stacks of each associated RAT. The baseband memory may be store the aforementioned program code. The baseband modem 106 may be configured to control one or more further components of communication device 100. The protocol stack(s) of baseband modem 106 may be configured to control operation of the baseband modem 106, such as in order to transmit and receive mobile communication in accordance with the corresponding RAT(s).

It is understood that a person of skill in the art will appreciate the corresponding structure disclosed herein, be it in explicit reference to a physical structure and/or in the form of mathematical formulas, prose, flow charts, or any other manner providing sufficient structure (such as e.g. regarding an algorithm). The components of baseband modem 106 may be detailed herein substantially in terms of functional operation in recognition that a person of skill in the art may readily appreciate the various possible structural realizations of baseband modem 1106 using digital processing circuitry that will provide the desired functionality.

In an exemplary aspect of the disclosure, the baseband modem is configured to trigger a HARQ NACK back to the network after receiving a PDSCH grant (e.g. Message 4 of the RACH setup process) during, or after, the random access channel (RACH) procedure even if the PDSCH grant was successfully received while also forwarding the grant to higher levels in the protocol stack. Alternatively, the baseband modem may also rely on a normal, or natural, NACK, i.e. not forced or triggered by the baseband modem. The baseband modem is further configured to detect whether the network sends a retransmission of the PDSCH grant (e.g. Message 4 of the RACH setup process), and if the baseband modem detects a retransmission, then the baseband modem is further configured to switch to a power efficient mode in which PDSCH decoding is skipped. If no retransmission is sent from the network, then the baseband modem is configured to remain in a robust mode where PDSCH decoding is not skipped. The baseband modem may be further configured to switch from the power efficient mode to the robust mode upon the occurrence of certain conditions, e.g. upon radio resource control (RRC) connection release.

The application processor 108 may be implemented as a Central Processing Unit (CPU), and may function as a controller of communication device 100. The application processor 108 may be configured to execute various applications and/or programs of communication device 100, such as, for example, applications corresponding to program code stored in a memory component of communication device 100 (not shown in FIG. 1). The application processor 108 may also be configured to control one or more further components of communication device 100, such as, for example, input/output devices (e.g. display(s), keypad(s), touchscreen(s), speaker(s), microphone(s), button(s), etc.) peripheral devices, a memory, power supplies, external device interfaces, etc.

Although the baseband modem 106 and application processor 108 are depicted separately in FIG. 1, it is appreciated that the figure is not limiting in nature. It is understood that the baseband modem 106 and the application processor 108 may be implemented separately, implemented together (i.e. as an integrated unit), partially implemented together, etc.

Figure 2:
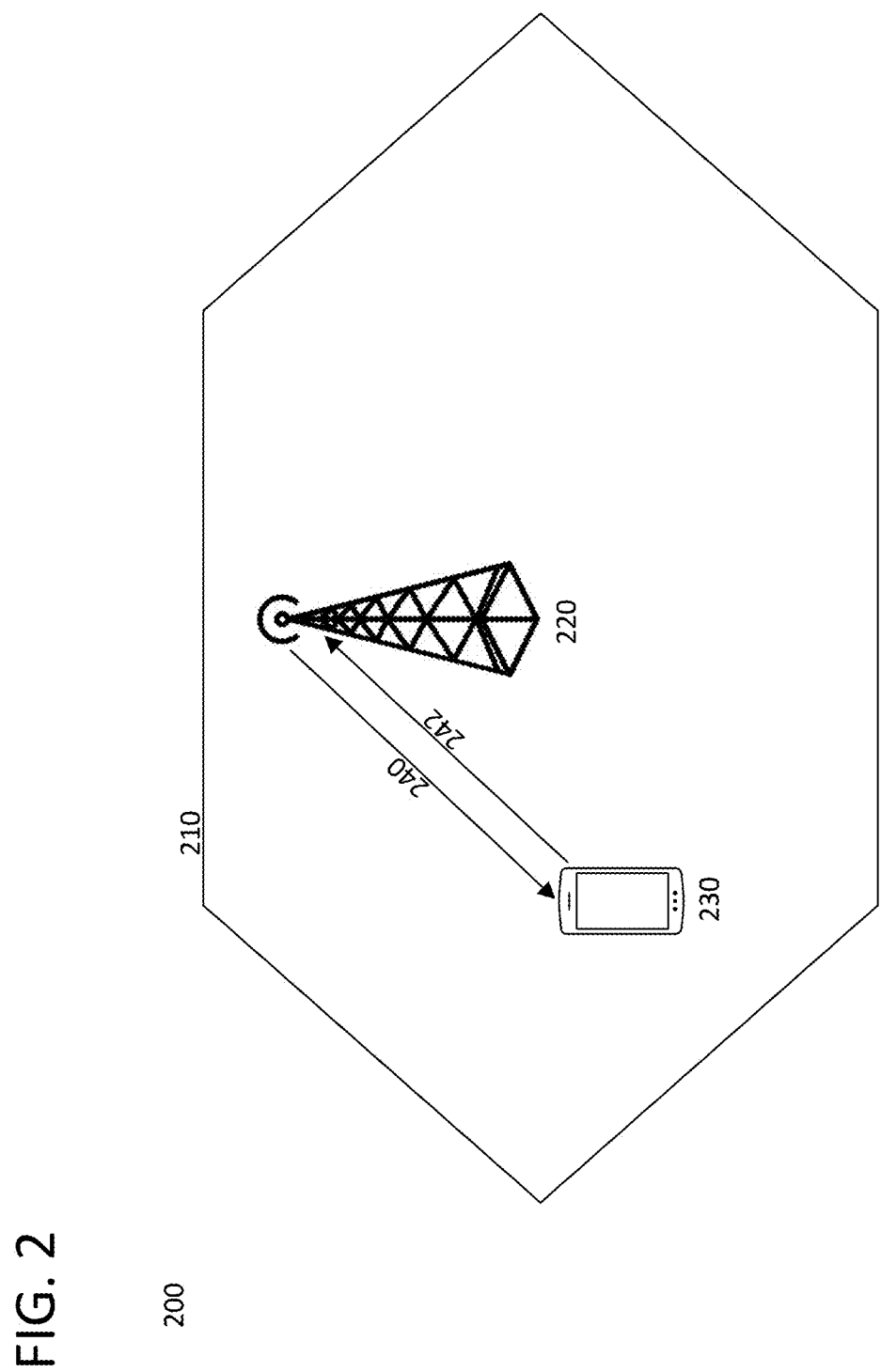
FIG. 2 shows a communication network in an aspect of this disclosure.

FIG. 2 shows a communication network 200 in an aspect of this disclosure. It is appreciated that communication network 200 is exemplary in nature and may thus be simplified for purposes of this explanation.

Communications Network 200 may be configured in accordance with the network architecture of any one of, or any combination of, 5G, LTE (Long Term Evolution WLAN (wireless local area network), UMTS (Universal Mobile Telecommunications System), GSM (Global System for Mobile Communications), Bluetooth, CDMA (Code Division Multiple Access), Wideband CDMA (W-CDMA), etc. Furthermore, communication network 200 may be a test box network.

Base station 220 may be associated with a radio access section of communication network 200. the Radio Access Network (RAN) of communication network 200. Base station 220 may thus act as an interface between the RAN of communication network 200 and an underlying core network of communication network 200 and may allow any proximate UEs, such as, for example, UE 230 to exchange data with the core network of communication network 200. In the case where communication network is a test box network, test box 220 acts as the interface between the RAN of communication network and UE 230, i.e. the test box 220 will act as the "base station" for the UE in a test case scenario. For purposes of this explanation, the term "base station" will encompass the interface which provides a UE with access to a communication network, e.g. an eNB, test box, etc. Communication network 200 may include at least a base station 220 with a corresponding coverage region, or cell, 210.

The standard LTE downlink and uplink between a UE and the base station are demonstrated by 120 and 122, respectively. The D2D communication, or sidelink, is demonstrated by 124.

LTE downlink 240 is the signal from the base station 220 to the UE 230. LTE downlink uses an Orthogonal Frequency Division Multiple Access (OFDMA) scheme, which is a multiple access version of Orthogonal Frequency Division Multiplexing (OFDM). OFDM is a frequency-division multiplexing which splits the carrier frequency bandwidth into many small subcarriers and then modulates each individual subcarrier using a digital modulation format. This allows encoding of digital data on multiple carrier frequencies.

OFDMA provides for high data rate through the radio channel as well as other advantages, for example, efficient implementation using Fast Fourier Transforms (FFT) and robustness against inter-symbol interference. However, it also has a high Peak-to-Average Power Ratio (PAPR). While in the downlink this may not be much of a concern since the base station 220 may be well equipped to handle the power consumption and heat dissipation issues, this presents a problem if used in the LTE uplink.

LTE uplink 122 is the signal from the UE 230 to the base station 220 and uses Single Carrier Frequency Division Multiple Access (SC-FDMA) scheme. SC-FDMA has a lower PAPR than OFDM. As a result, SC-FDMA reduces battery power consumption and design complexity compared to OFDM. SC-FDMA also differs from OFDM in that data may be spread across multiple subcarriers, whereas in OFDM, each subcarrier (or frequency component) carries unique information.

Figure 3:
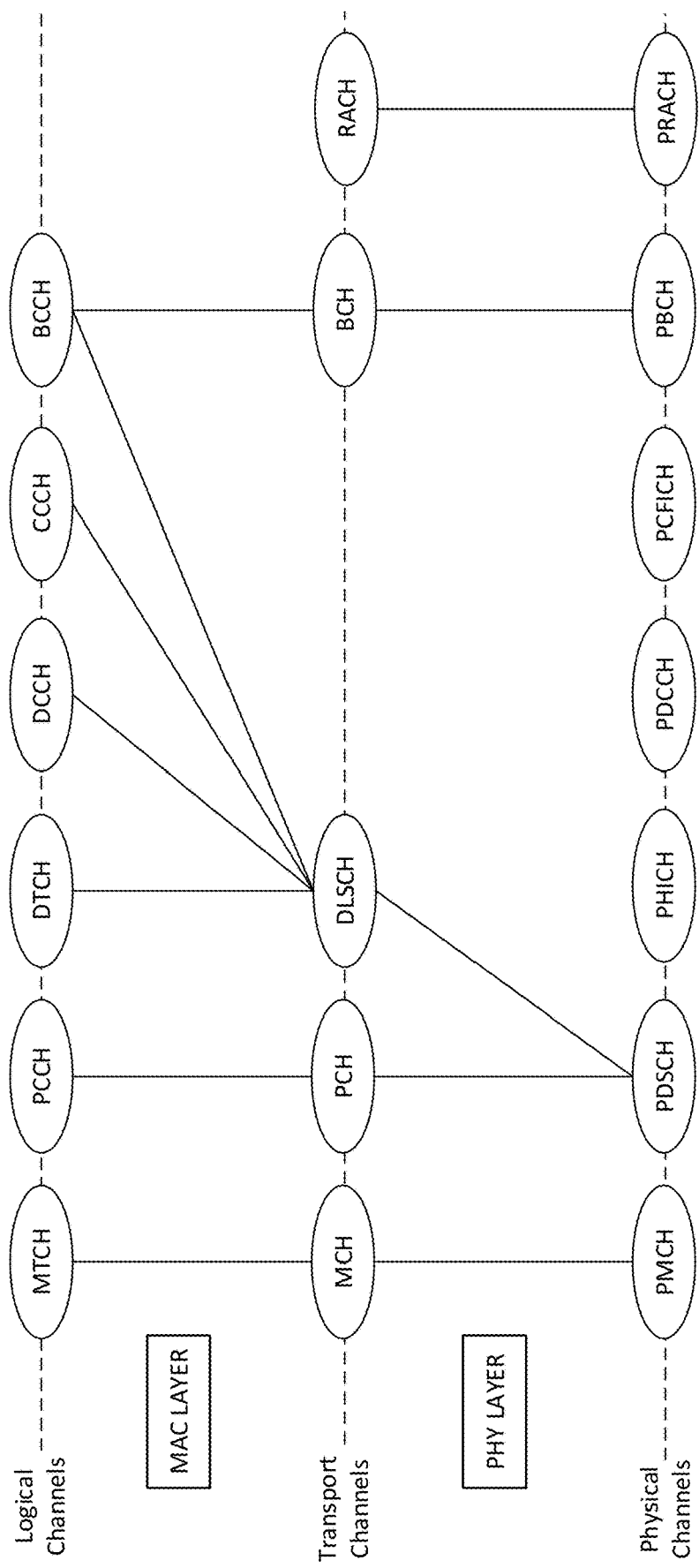
FIG. 3 shows a downlink channel map in an aspect of this disclosure.

FIG. 3 shows a map 300 of downlink channels in an aspect of this disclosure. It is appreciated that map 300 is exemplary in nature and may thus be simplified for purposes of this explanation.

The Medium Access Control (MAC) layer is the lowest sublayer in the layer 2 architecture of the LTE radio protocol stack and acts as the intermediary between the physical layer (PHY) and the higher levels, e.g. Radio Link Control (RLC) layer. The MAC is connected to the PHY layer through the transport channels and the RLC layer through the logical channels. The MAC layer provides a data transfer service to the RLC layer through logical channels.

The logical channels may be split into two categories, control logical or traffic logical. The control logical channels transport control data such as Radio Resource Control (RRC) signaling while the traffic logical channels are for user plane data.

The logical channel includes the Broadcast Control Channel (BCCH), which is a downlink channel used to broadcast System Information and any Public Warning System messages and is associated with a transparent mode (TM) RLC entity; the Common Control Channel (CCCH), which is used to deliver control information in both uplink and downlink directions during the connection establishment between the UE and the eNB and is also associated with the TM RLC entity; the Dedicated Control Channel (DCCH), which is used to transmit dedicated control information relating to a particular UE in both uplink and downlink directions and is associated with an acknowledged mode (AM) RLC entity; and the Paging Control Channel (PCCH), which is used to notify a UE of an incoming call or a change in SI and is associated with a TM RLC entity.

The traffic channels include the Dedicated Traffic Channel (DTCH), which is used to transmit a dedicated user data and can be associated with either an unacknowledged mode (UM) RLC entity or an AM RLC entity; and the Multicast Traffic Channel (MTCH), which is used to transmit user data for multimedia broadcast multicast service (MBMS) in the downlink and is associated with an UM RLC entity.

The transport channels provide the interface for the exchange of data between the MAC and PHY layers. In the downlink, the transport channels are the Broadcast Channel (BCH), which is used to transport the components of the SI that are essential for access to the Downlink Shared Channel (DLSCH); the DLSCH is used to transports downlink user data or control messages and also transports the remaining parts of the SI that are not transported via the BCH; the Paging Channel (PCH), which is used to transport paging information to the UEs and to inform the UEs about updates to the SI and Public Warning System; and the Multicast Channel (MCH) which is used to transport MBMS user data and control messages that require Multimedia Broadcast Single Frequency Network combining.

The physical channels include the Physical Broadcast Channel (PBCH) which is used to broadcast the master information block (MIB) using the BCH as the transport layer and also broadcasts a limited number of parameters which are essential for initial access to the cell. The PBCH is mapped onto the central 72 subcarriers of the orthogonal frequency division multiplexing (OFDM) signal and is always broadcasted on the first four symbols of the second slot of every radio frame.

The physical downlink shared channel (PDSCH) is the main data bearing downlink channel. It is used for all user data, broadcast system information which is not carried by the PBCH, and for paging messages as there is no specific physical layer paging channel in LTE. The PDSCH transmits data in Transport Blocks (TBs), which correspond to a MAC layer Protocol Data Unit (PDU). TBs may be passed down from the MAC layer to the PHY once per transmission time interval (TTI), where a TTI is 1 ms. The Resource Elements (REs) used for the PDSCH can be any which are not used for other purposes, such as reference signals, PBCH, synchronization signals, etc.

The Physical Downlink Control Channel (PDCCH) carries a message known as Downlink Control Information (DCI). The DCI includes resource assignments (e.g. PDSCH grants) and other control information for a UE (or a group of UEs). In order for the UE to identify whether it has received the PDSCH transmission correctly, a cyclic redundancy check (CRC) is added to each PDCCH. Furthermore, the CRC is scrambled with a UE identity in order for the UE to identify by using a radio network identifier (RTNI) which PDCCH(s) are intended for it. The network broadcasts the PDCCH in the first part of each subframe.

Other physical channels for downlink include the Physical Control Format Indicator Channel (PCFICH), which carries a control format indicator (CFI) indicating the number of OFDM symbols (normally 1, 2, or 3) used for transmission of control channel information in each subframe; the Physical Hybrid ARQ Indicator Channel (PHICH), which carries the HARQ ACK/NACK indicating whether the eNB has correctly received a transmission on the PUSCH; and the (PMCH) which is designed to carry data for MBMS.

Also shown on channel map 300 is the Physical Random Access Channel (PRACH) and its associated transport channel, the Random Access Channel (RACH). The RACH is used to access the network when the UE does not have accurate uplink timing synchronization or when the UE does not have any allocated uplink transmission resources.

The RACH process is performed after the UE has selected the preferred network and plays two pivotal roles: establishment of uplink synchronization and of a unique UE identification, known as the cell radio network temporary identifier (C-RNTI) which is used for all future UE-specific transmissions.

Figure 4:
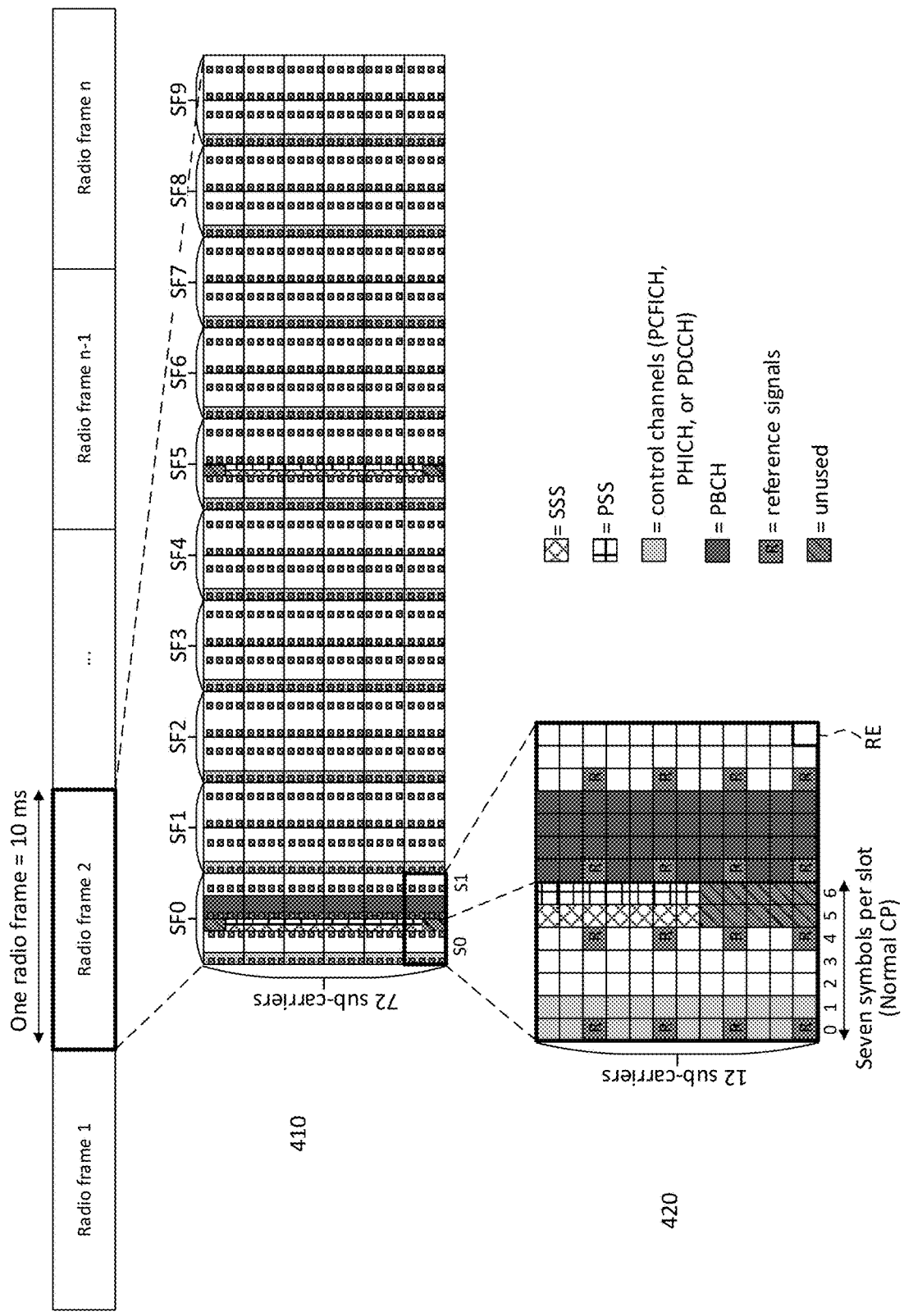
FIG. 4 shows an LTE radio frame structure in an aspect of this disclosure.

FIG. 4 shows an LTE downlink radio frame structure 400 in an aspect of this embodiment. It is appreciated that radio frame structure 400 is exemplary in nature and may thus be simplified for purposes of this explanation.

An LTE radio frame is 10 ms in duration and is divided into ten subframes (SF0, SF1, . . . SF9) of 1 ms each 410. Each subframe is further divided into two slots of 0.5 ms each, e.g. slot 0 (S0) and slot 1 (S1) in SF0. Each slot is further divided into either six or seven symbols, depending on the cyclic prefix (CP) length. The CP is inserted at the beginning of each symbol in order to combat inter-symbol interference (not shown). If a normal CP is used, then each slot has seven symbols (as shown in 420 in FIG. 4). If an extended CP is used, then each slot contains six symbols (not shown). The radio frames are used to send system information between the UE and the eNB, while subframes facilitate resource allocation and slots are useful for synchronization.

In LTE, radio resources are allocated in Physical Resource Blocks (PRB). Each PRB contains 12 subcarriers and one slot. For example, if a normal CP is used, a PRB will contain 12 subcarriers transmitted over seven symbols. FIG. 4 shows the minimum number of subcarriers necessary to comply with the LTE bandwidth requirements, i.e. 72 sub-subcarriers.

Two PRBs in the first subframe (SF0) are demonstrated in the blown up section 420 of FIG. 4, i.e. twelve subcarriers across two slots (S0 and S1). As demonstrated in 420, Resource Elements (REs) are allocated for reference signals in the downlink radio frame structure. In radio frame structure 400, the reference signals are allocated REs in the first and fifth symbols of every slot every third subcarrier.

The rest of the REs in the first couple of symbols (in 400, symbols 0 and 1) of every subframe which are not allocated to reference signals are allocated to control channel signaling, i.e. the PDCCH, PDCFICH, and PHICH. Additionally, the sixth and seventh symbols of the first slot in the first subframe (SF0) and the sixth subframe (SF5) are dedicated to the primary synchronization signal (PSS) and the secondary synchronization signal (SSS). The PSS and the SSS are spread across the middle 62 sub-carriers of the LTE radio frame, thereby leaving unused sub-carriers on each end. In this example, since only the minimum 72 subcarriers necessary for LTE bandwidth are shown, the PSS and the SSS will leave 5 unused subcarriers at each end (i.e. top and bottom) of their signals in the frequency domain. Finally, the first four symbols of the second slot (S1) of the first subframe (SF0) in each radio frame are allocated to the PBCH. The rest of the resource elements, which in FIG. 4 are shown as the white blocks, are available for PDSCH. As demonstrated by FIG. 4, the PDSCH is allocated a majority of the available space in the LTE radio frame structure, and therefore, a UE spends a significant portion of its resources, e.g. power, decoding the PDSCH. However, there may be instances in which there is no data on the PDSCH allocated to a specific UE. In this case, the UE spends valuable resources, e.g. power, decoding the PDSCH. Furthermore, a UE may not need to decode the PDSCH on a first transmission if the network supports retransmissions.

Figure 5:
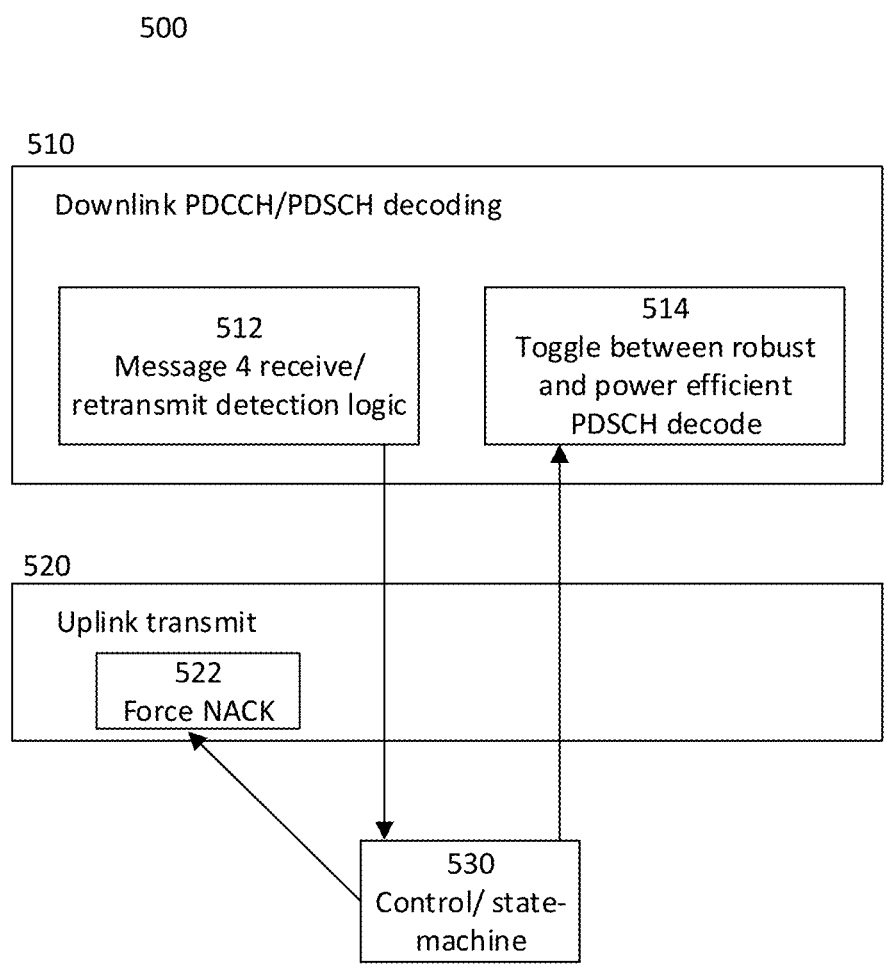
FIG. 5 shows an entity diagram in an aspect of this disclosure.

FIG. 5 shows a diagram 500 depicting the involved entities in an aspect of this disclosure. It is appreciated that diagram 500 is exemplary in nature and may thus be simplified for purposes of this explanation.

In the downlink PDCCH/PDSCH decoding logic 510, a new entity is added to detect reception of message 4 512 (both new transmissions and retransmissions). Another entity is added to toggle between robust mode (in which PDSCH is decoded) and a power efficient mode (in which PDSCH decoding may be skipped) 514. In the uplink transmit 520, a new entity is added to force a NACK transmission 522.

A control entity/state machine 530 is added to the controller (i.e. baseband modem) in order to manage everything. The control entity 530 is informed when a new or a retransmission of a message 4 is received and triggers a NACK 522 to detect if the network supports HARQ retransmissions. If the control entity 530 detects that the network supports HARQ retransmissions, i.e. the network retransmits message 4, the control entity 530 can switch to the power efficient PDSCH decode mode.

Figure 6:
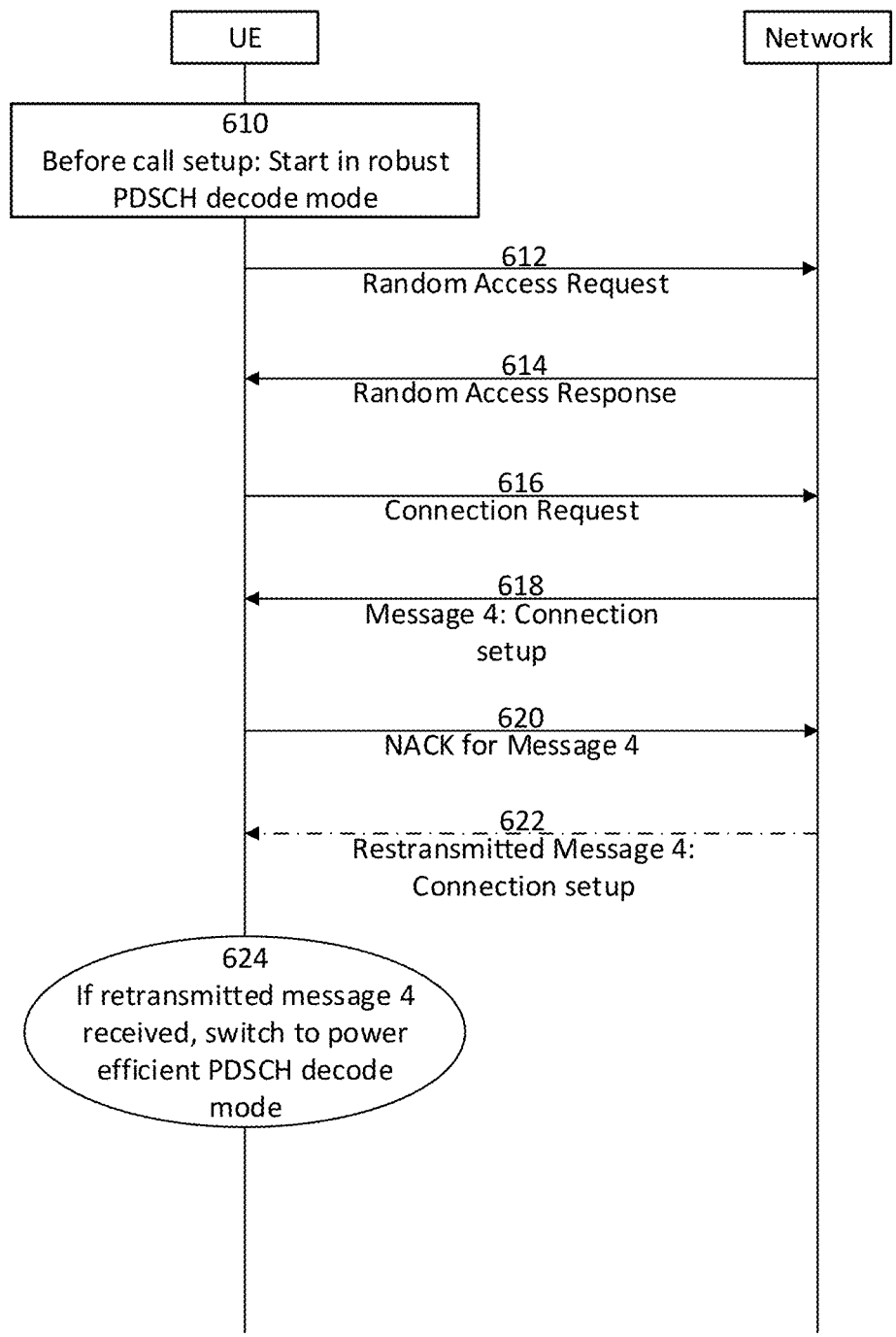
FIG. 6 shows a message sequence chart (MSC) in an aspect of this disclosure.

FIG. 6 shows a message sequence chart (MSC) 600 in an aspect of this disclosure. It is appreciated that MSC 600 is exemplary in nature and may thus be simplified for purposes of this explanation.

Before LTE call setup, the default mode is set to robust mode 610, i.e. PDSCH decoding is not skipped. In 612, the UE sends a Random Access Request 612 to the network in order to connect to the network, i.e. Message 1. Here, the UE selects one of the 64 RACH preambles (contention-free), i.e. the random access radio network temporary identity (RA-RNTI). Thereby, the base station (i.e. the test box or the eNB) can control the number of signatures in each subgroup according to the observed loads in each group.

The network sends back a Random access response 614, i.e. Message 2, on the PDSCH addressed to the RA-RNTI calculated from the slot in which the preamble from message 1 was sent. The Random Access Response 614 contains the temporary cell temporary radio network temporary identifier (T-CRNTI), which is the identity the eNB (or test box) assigns the UE for further communications.

The UE then responds to the network with a Connection request 616, i.e. Message 3. This message is the first scheduled uplink transmission on the PUSCH and conveys the actual random access procedure message.

The network responds with the Connection setup 618, i.e. Message 4. This message is the contention resolution message to the UE indicating reception of Message 3. Message 4 contains the cell temporary radio network temporary identifier (C-RNTI) which will be used for further communications.

During connection setup after Message 4 is received, the UE will trigger a forced NACK 620, even if the Message 4 was properly received. If the network sends a retransmission of Message 4, the UE will switch to the power efficient PDSCH decode mode. Once the call is released, the UE may switch back to the robust mode, i.e. decoding all PDSCH.

Alternatively, the forced NACK may be triggered at any point after the RACH procedure.

In another embodiment of this disclosure, the device may rely on natural NACKs (i.e. not forced) to turn on the efficient mode wherein the PDSCH decoding is skipped.

Figure 7:
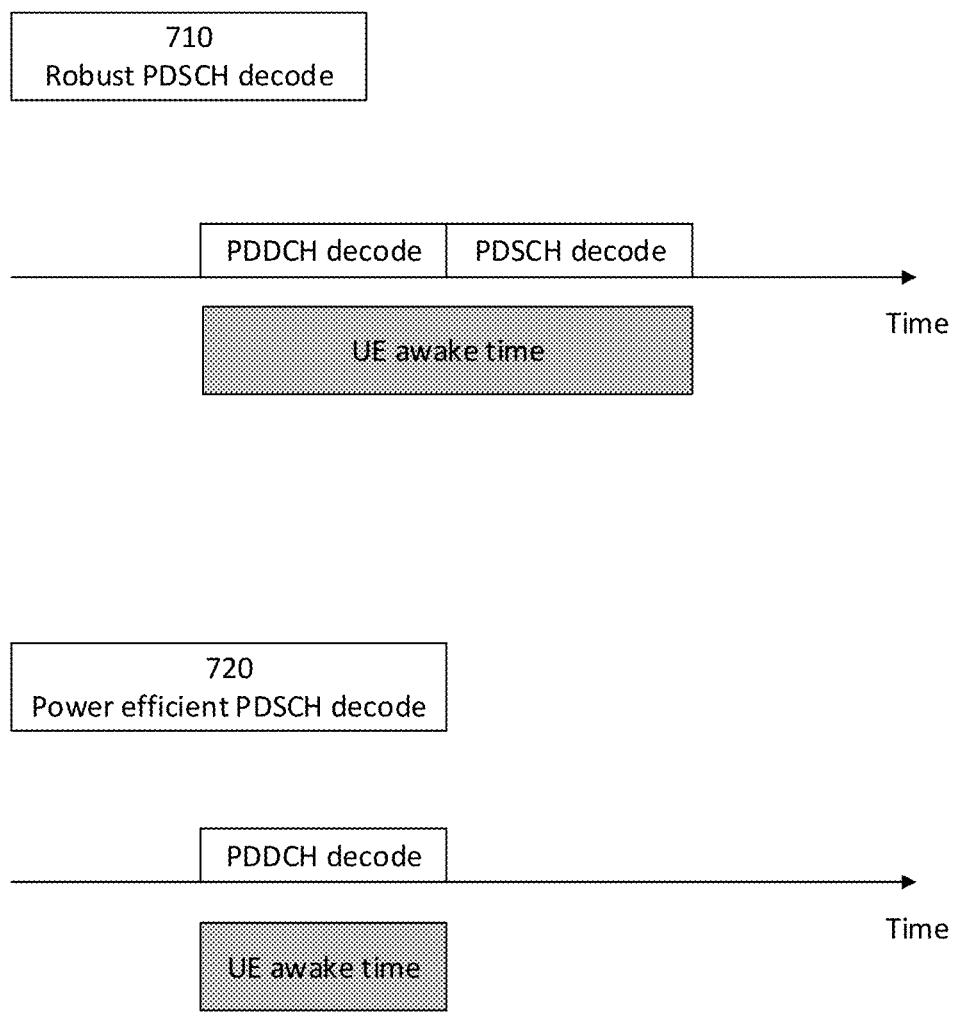
FIG. 7 shows two modes of decoding data from a network in an aspect of this disclosure.

FIG. 7 shows the difference between the robust PDSCH decode mode 710 and the power efficient PDSCH decode mode 720. It is appreciated that FIG. 7 is exemplary in nature and may therefore be simplified for purposes of this explanation.

In robust PDSCH decode mode 710, the UE will receive and decode both the PDCCH and subsequently the PDSCH if a downlink grant was received. This will require the UE to stay awake for a longer duration.

In the power efficient PDSCH decode mode 720, the UE will only decode the PDCCH. In this case, the UE will not have to stay awake for as long, thereby decreasing power consumption.

Figure 8:
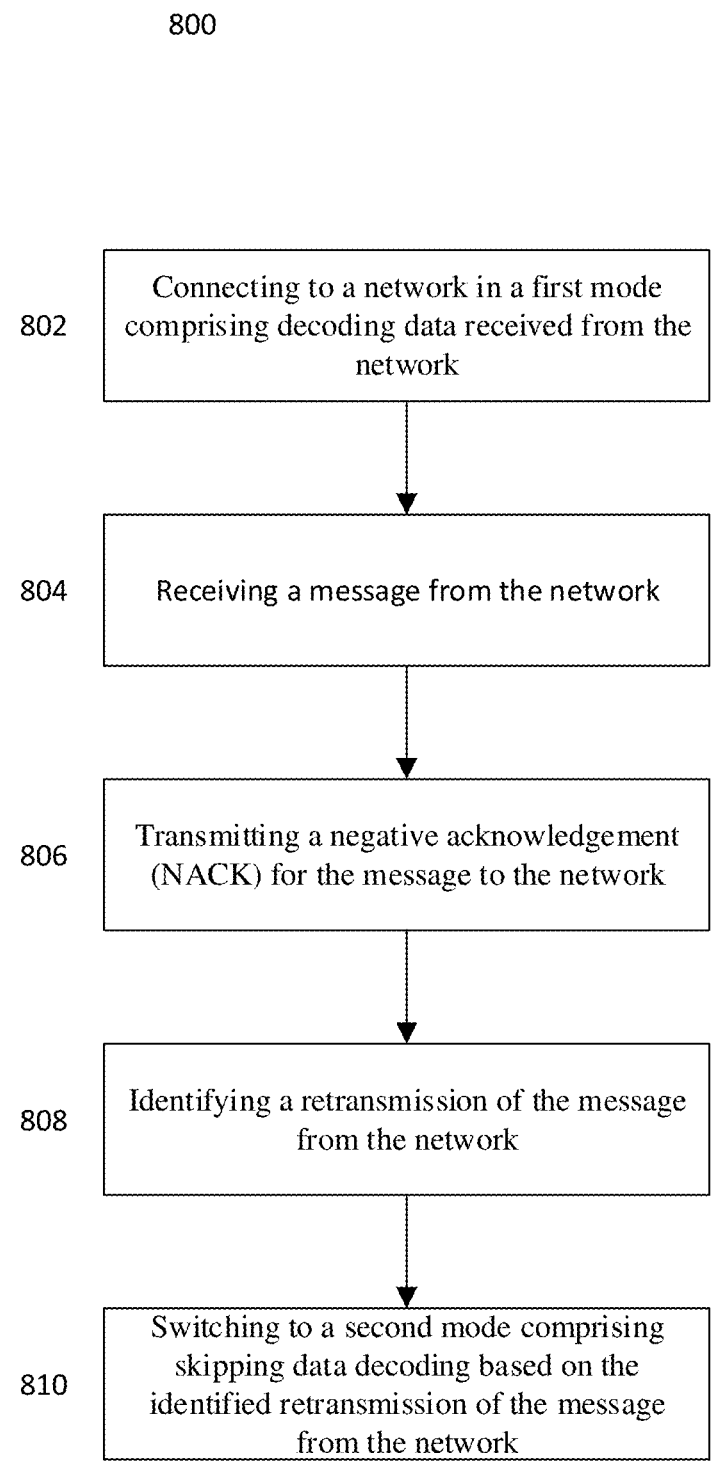
FIG. 8 shows a flowchart in an aspect of this disclosure.

FIG. 8 shows a flowchart 800 in an aspect of this disclosure. It is appreciated that flowchart 800 is exemplary in nature and may therefore be simplified for purposes of this explanation.

In 802, the communication device is initially in a first mode where data received from the network is decoded. This data includes PDSCH grants. In 804, the communication device receives a message from the network. This message may be a message received during the RACH/connection setup procedure, e.g. the initial RRC connection setup message, i.e. message 4 in the RACH procedure. It is important to note that relying on radio link control (RLC) retransmissions will not work during the RACH setup process because Message 4 is sent via transparent mode (TM) where RLC retransmissions will not occur. In TM, the RLC entity is transparent to the Protocol Data Units (PDUs) that pass through it, i.e. no functions are performed. Additionally, RLC retransmissions may happen much later (after the RACH setup process has been completed), at which point the first transmission may fail due to skipping PDSCH decoding.

In 806, the communication device transmits a negative acknowledgement (NACK) for the message received in 804 back to the network. This may be done even if it successfully received the message in 804. After transmitting the NACK 806, the communication device will then identify a retransmission of the message from the network 808. If the retransmission is received from the network, the communication device will switch to a second mode 810 in which it skips decoding the data, i.e. the PDSCH.

Figure 9:
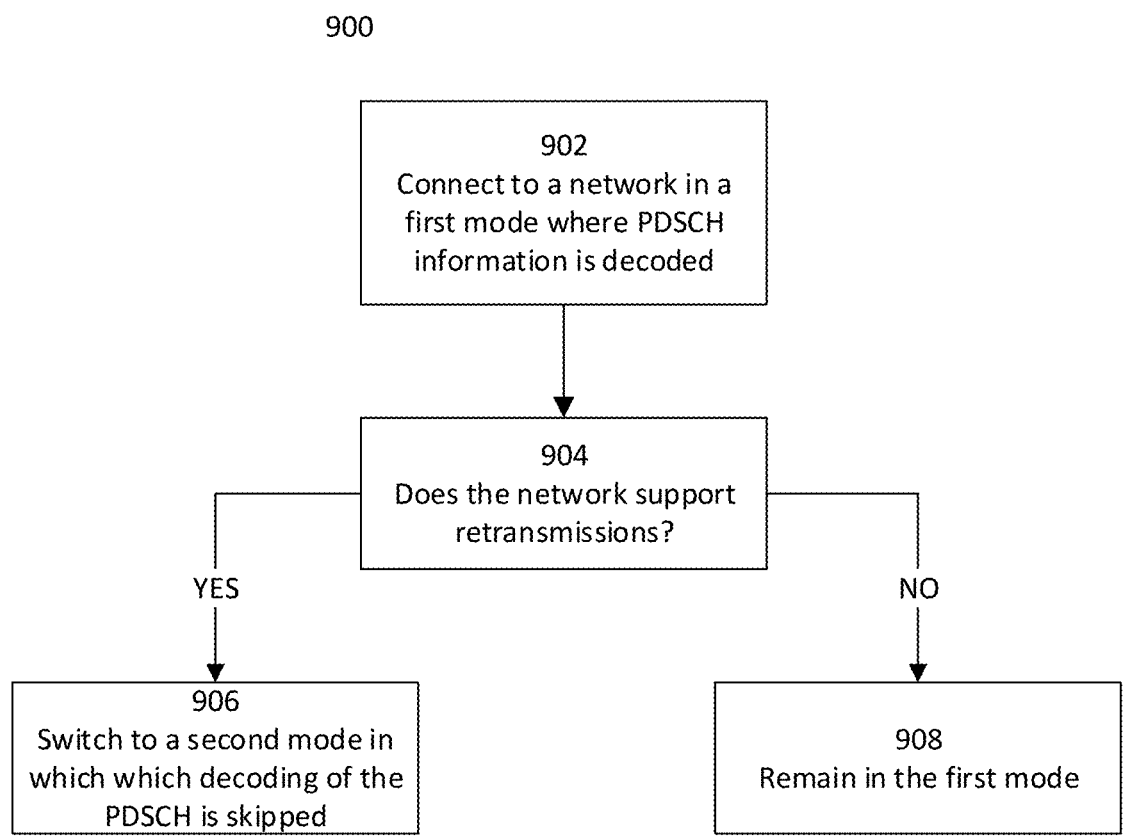
FIG. 9 shows a flowchart in an aspect of this disclosure.

FIG. 9 shows a flowchart 900 in an aspect of this disclosure. It is appreciated that flowchart 900 is exemplary in nature and may therefore be simplified for purposes of this explanation.

In 902, a communication device connects to a network in a first mode in which information from the PDSCH is decoded. In 904, the communication device makes the determination whether the network supports retransmissions. The communication device may do so by triggering a NACK to the network after receiving a message, e.g. Message 4 of the RACH connection setup procedure, even if the communication device successfully received the message. The determination whether the network supports retransmissions can be made as soon as the RRC Connection Setup message containing the C-RNTI, i.e. Message 4, is received from the network.

If the communication device receives a retransmission of the message from the network, then the network does support retransmissions, and the communication device switched to a second mode in which the decoding of the PDSCH is skipped 906. However, if the communication device does not receive a retransmission of the message, the communication device will remain in the first mode 908.

In Example 1, a method adapted for network data decoding and connection modes switching used for a communication device in a mobile communication system, the method comprising: connecting to a network in a first mode comprising decoding data received from the network; receiving a message from the network; transmitting a negative acknowledgement (NACK) for the message to the network; identifying a retransmission of the message from the network; and switching to a second mode comprising skipping data decoding based on the identified retransmission of the message from the network.

In Example 2, the subject matter of Example 1 may include comprising remaining in the first mode if the communication device does not receive the retransmission of the message from the network.

In Example 3, the subject matter of Examples 1-2 may include wherein the data decoded by the communication device comprises data sent over a physical downlink shared channel (PDSCH).

In Example 4, the subject matter of Examples 1-3 may include wherein the message comprises a Radio Resource Control (RRC) connection setup message.

In Example 5, the subject matter of Example 4 may include wherein the RRC connection setup message comprises a cell radio network temporary identifier (C-RNTI) for the communication device.

In Example 6, the subject matter of Examples 1-5 may include wherein the NACK comprises a hybrid automatic repeat request (HARD) NACK.

In Example 7, the subject matter of Examples 1-6 may include further comprising transmitting the NACK for the message back to the network even when the message is successfully received at the communication device.

In Example 8, the subject matter of Examples 1-7 may include further comprising transmitting the NACK during a random access channel (RACH) connection setup procedure.

In Example 9, the subject matter of Examples 1-8 may include wherein an interface between the communication device and the network comprises a test box.

In Example 10, the subject matter of Example 9 may include wherein the test box is configured to disable HARQ retransmissions.

In Example 11, the subject matter of Examples 1-10 may include further comprising switching to the first mode from the second mode upon a predetermined condition.

In Example 12, the subject matter of Example 11 may include wherein the predetermined condition is a release from a radio resource control (RRC) connection.

In Example 13, a method for method for a communication device to switch between two data decoding modes in a network, comprising: a first mode comprising decoding a physical data shared channel (PDSCH) information from the network and a second mode comprising skipping decoding of a first transmission of a PDSCH information from the network, wherein the communication device is initially connected to the network in the first mode and switches to the second mode upon determining that the network supports hybrid-automatic repeat request (HARQ) retransmissions.

In Example 14, the subject matter of Example 13 may include the communication device sending a forced negative acknowledgment request (NACK) after receiving a PDSCH transmission in order to determine whether the network supports HARQ retransmissions.

In Example 15, the subject matter of Examples 13-14 may include causing the communication device to switch to the second mode upon the communication device receiving a PDSCH retransmission..

In Example 16, the subject matter of Example 14 may include the communication device sending the forced NACK during a random access channel (RACH) connection setup procedure.

In Example 17, the subject matter of Example 16 may include sending the forced NACK for the radio resource control (RRC) connection setup message containing a radio network temporary identifier (RNTI).

In Example 18, the subject matter of Examples 13-17 may include the communication device connecting to the network via a test box.

In Example 19, the subject matter of Example 18 may include wherein the test box is configured to disable HARQ retransmissions.

In Example 20, the subject matter of Examples 13-19 may include switching to the first mode from the second mode upon a predetermined condition.

In Example 21, the subject matter of Example 20 may include where the predetermined condition is a release from a radio resource control (RRC) connection.

In Example 22, an apparatus adapted to decode network data and switch connection modes in a mobile communication, comprising: a transceiver configured to transmit and receive data with a network; a baseband modem coupled to the transceiver and configured to: connect to the network in a first mode comprising decoding data received from the network; receive a message from the network; transmit a negative acknowledgement (NACK) for the message to the network; identify a retransmission of the message from the network; and switch to a second mode comprising skipping data decoding based on the identified retransmission of the message from the network.

In Example 23, the subject matter of Example 22 may include the baseband modem further configured to remain in the first mode if the apparatus does not receive the retransmission of the message from the network.

In Example 24, the subject matter of Examples 22-23 may include wherein the data comprises a physical downlink shared channel (PDSCH).

In Example 25, the subject matter of Examples 22-24 may include wherein the message comprises a radio resource control (RRC) connection message.

In Example 26, the subject matter of Example 25 may include wherein the RRC connection message comprises a cell radio network temporary identifier (C-RNTI) for the apparatus.

In Example 27, the subject matter of Examples 22-26 may include wherein the NACK comprises a hybrid automatic repeat request (HARQ) NACK.

In Example 28, the subject matter of Examples 22-27 may include the baseband modem further configured to transmit the NACK for the message back to the network even when the message is successfully received at the apparatus.

In Example 29, the subject matter of Examples 22-28 may include the baseband modem further configured to transmit the NACK during a random access channel (RACH) connection setup procedure.

In Example 30, the subject matter of Examples 22-29 may include wherein an interface between the apparatus and the network comprises a test box.

In Example 31, the subject matter of Example 30 may include wherein the test box is configured to disable HARQ retransmissions.

In Example 32, the subject matter of Examples 22-31 may include the baseband modem further configured to switch to the first mode from the second mode upon a predetermined condition.

In Example 33, the subject matter of Example 32 may include wherein the predetermined condition is a release from a radio resource control (RRC) connection.

In Example 34, an apparatus configured to switch between two modes in decoding data from a network, comprising: a radio frequency (RF) unit configured to transmit and receive data with the network; and a baseband modem coupled to the RF unit and configured to switch between two modes comprising: a first mode comprising decoding physical data shared channel (PDSCH) information from the network; and a second mode comprising skipping decoding of PDSCH information from the network, wherein the apparatus is initially connected to the network in the first mode and switches to the second mode upon determining that the network supports retransmissions.

In Example 35, the subject matter of Example 34 may include wherein the retransmissions comprise hybrid automatic repeat request (HARD) retransmissions.

In Example 36, the subject matter of Examples 34-35 may include the baseband modem further configured to send a forced negative acknowledgment request (NACK) to the network via the RF unit after receiving a PDSCH transmission in order to determine whether the network supports retransmissions.

In Example 37, the subject matter of Examples 34-37 may include the baseband modem further configured to switch to the second mode upon receiving a PDSCH retransmission from the network via the RF unit.

In Example 38, the subject matter of Example 37 may include the baseband modem further configured to send the forced NACK during a random access channel (RACH) connection setup procedure.

In Example 39, the subject matter of Examples 36-38 may include the baseband modem further configured to send the forced NACK for the radio resource control (RRC) connection setup message containing a radio network temporary identifier (RNTI).

In Example 40, the subject matter of Examples 34-39 may include the baseband modem further configured to switch to the first mode from the second mode upon a predetermined condition.

In Example 41, the subject matter of Example 40 may include where the predetermined condition is a release from a radio resource control (RRC) connection.

In Example 42, a non-transitory computer readable medium with program instructions when executed to cause a processor of a communication device to decode data from a network, comprising: connecting to a network in a first mode comprising decoding data received from the network; receiving a message from the network; transmitting a negative acknowledgement (NACK) for the message to the network; identifying a retransmission of the message from the network; and switching to a second mode comprising skipping data decoding based on the identified retransmission of the message from the network.

In Example 43, the subject matter of Example 42 may include remaining in the first mode if the communication device does not receive the retransmission of the message from the network.

In Example 44, the subject matter of Examples 42-43 may include wherein the data comprises data sent via a physical downlink shared channel (PDSCH).

In Example 45, the subject matter of Examples 42-44 may include further comprising the message comprising a Radio Resource Control (RRC) connection setup message.

In Example 46, the subject matter of Example 45 may include the RRC connection setup message comprising a cell radio network temporary identifier (C-RNTI) for the communication device.

In Example 47, the subject matter of Examples 42-46 may include the NACK comprising a hybrid automatic repeat request (HARQ) NACK.

In Example 48, the subject matter of Examples 42-47 may include transmitting the NACK for the message back to the network even when the message is successfully received at the communication device.

In Example 49, the subject matter of Examples 42-48 may include transmitting the NACK during a random access channel (RACH) connection setup procedure.

In Example 50, the subject matter of Examples 42-49 may include wherein an interface between the communication device and the network comprises a test box.

In Example 51, the subject matter of Example 50 may include wherein the test box is configured to disable HARQ retransmissions.

In Example 52, the subject matter of Examples 42-51 may include the communication device automatically switching to the first mode from the second mode upon a predetermined condition.

In Example 53, the subject matter of Example 52 may include wherein the predetermined condition is a release from a radio resource control (RRC) connection.

In Example 54, a non-transitory computer readable medium with program instructions when executed to cause a processor of a communication device to switch between two modes for data decoding from a network, comprising: a first mode comprising decoding a physical data shared channel (PDSCH) information from the network and a second mode comprising skipping decoding of a first transmission of a PDSCH information from the network, wherein the communication device is initially connected to the network in the first mode and switches to the second mode upon determining that the network supports hybrid-automatic repeat request (HARQ) retransmissions.

In Example 55, the subject matter of Example 54 may include the communication device sending a forced negative acknowledgment request (NACK) after receiving a PDSCH transmission in order to determine whether the network supports HARQ retransmissions.

In Example 56, the subject matter of Examples 54-55 may include the communication device receiving a PDSCH retransmission, thereby causing the communication device to switch to the second mode.

In Example 57, the subject matter of Example 55-56 may include the communication device sending the forced NACK during a random access channel (RACH) connection setup procedure.

In Example 58, the subject matter of Example 57 may include sending the forced NACK for the radio resource control (RRC) connection setup message containing a radio network temporary identifier (RNTI).

In Example 59, the subject matter of Examples 54-58 may include comprising the communication device connecting to the network via a test box.

In Example 60, the subject matter of Example 59 may include wherein the test box is configured to disable HARQ retransmissions.

In Example 61, the subject matter of Examples 54-60 may include switching to the first mode from the second mode upon a predetermined condition.

In Example 62, the subject matter of Example 61 may include where the predetermined condition is a release from a radio resource control (RRC) connection.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims, and all changes within the meaning and range of equivalency of the claims are therefore intended to be embraced.

What is claimed is:

1. An apparatus adapted to decode network data and switch connection modes in mobile communications, comprising:

a transceiver configured to transmit and receive data with a network;
a baseband modem coupled to the transceiver and configured to:
connect to the network in a first mode in which messages received from the network over a physical downlink shared channel (PDSCH) are decoded;
receive a message over the PDSCH from the network, wherein the message comprises a radio resource control (RRC) connection message;
transmit a negative acknowledgement (NACK) for the message to the network;
identify whether a retransmission of the message is received from the network;
switch to a second mode when the retransmission of the message is received from the network or, otherwise, remain in the first mode, wherein decoding messages received over the PDSCH is not performed while in the second mode; and
switch to the first mode from the second mode based at least in part upon a predetermined condition, wherein the predetermined condition comprises a release from an RRC connection.

2. The apparatus of claim 1, wherein the NACK comprises a hybrid automatic repeat request (HARD) NACK.

3. The apparatus of claim 1, the baseband modem further configured to transmit the NACK for the message back to the network, wherein transmission of the NACK is triggered by a successful reception of the message.

4. The apparatus of claim 1, the baseband modem further configured to transmit the NACK during a random access channel (RACH) connection setup procedure.

5. The apparatus of claim 1, wherein an interface between the apparatus and the network comprises a test box.

6. The apparatus of claim 5, wherein the test box is configured to disable HARQ retransmissions.

7. An apparatus configured to switch between two modes in decoding data from a network, comprising:
a radio frequency (RF) unit configured to transmit and receive data with the network; and
a baseband modem coupled to the RF unit and configured to switch between two modes comprising:
a first mode comprising decoding physical data shared channel (PDSCH) information from the network; and
a second mode wherein decoding of PDSCH information from the network is not performed,
wherein the baseband modem is configured to:
send a forced negative acknowledgment request (NACK) to the network via the RF unit after successfully receiving a radio resource control (RRC) connection message in order to determine whether the network supports retransmissions, wherein the apparatus is initially connected to the network in the first mode and switches to the second mode based at least in part on determining that the network supports retransmissions; and
switch to the first mode from the second mode based at least in part upon a predetermined condition, wherein the predetermined condition comprises a release from an RRC connection.

8. The apparatus of claim 7, the baseband modem further configured to send the forced NACK during a random access channel (RACH) connection setup procedure.

9. The apparatus of claim 7, wherein an interface between the apparatus and the network comprises a test box.

10. The apparatus of claim 9, wherein the test box is configured to disable HARQ retransmissions.

11. A method adapted for network data decoding and connection modes switching used for a communication device in a mobile communication system, the method comprising:
connecting to a network in a first mode comprising decoding data received over a physical downlink shared channel (PDSCH) from the network;
receiving a message from the network over the PDSCH, wherein the message comprises a radio resource control (RRC) connection message;
transmitting a negative acknowledgement (NACK) for the message to the network;
identifying whether a retransmission of the message is received from the network in response to the NACK;
based at least in part on receiving the retransmission of the message from the network, switching to a second mode, wherein messages received over the PDSCH are not decoded while the communication device is in the second mode, wherein the communication device remains in the first mode when the retransmission of the message is not received from the network; and
switching to the first mode from the second mode based at least in part upon a predetermined condition, wherein the predetermined condition comprises a release from an RRC connection.

12. The method of claim 11, further comprising transmitting the NACK for the message back to the network, wherein transmission of the NACK is triggered by a successful reception of the message.

13. The method of claim 11, wherein an interface between the communication device and the network comprises a test box.

14. A non-transitory computer readable medium with program instructions executable a processor of a communication device to cause the communication device to:
switch between two modes for data decoding from a network, wherein the two modes comprise:
a first mode comprising decoding physical data shared channel (PDSCH) information from the network and a second mode wherein decoding of a first transmission of PDSCH information from the network is not performed;
sending a forced negative acknowledgment request (NACK) after successfully receiving a radio resource control (RRC) connection message in order to determine whether the network supports HARQ retransmissions,
wherein the communication device is initially connected to the network in the first mode and switches to the second mode upon determining that the network supports hybrid-automatic repeat request (HARQ) retransmissions,
wherein the program instructions are further executable by the processor to cause the communication device to:
switch to the first mode from the second mode based at least in part upon a predetermined condition, wherein the predetermined condition comprises a release from an RRC connection.

* * * * *